United States Patent [19]

Matsubara et al.

[11] Patent Number: 5,602,347
[45] Date of Patent: Feb. 11, 1997

[54] TOOL LIFE CONTROL METHOD BASED ON DISTURBANCE LOAD TORQUE OF MOTOR

[75] Inventors: Shunsuke Matsubara; Yasusuke Iwashita; Tadashi Okita, all of Oshino-mura, Japan

[73] Assignee: Fanuc Ltd., Japan

[21] Appl. No.: 335,879

[22] PCT Filed: Mar. 2, 1994

[86] PCT No.: PCT/JP94/00336

§ 371 Date: Nov. 15, 1994

§ 102(e) Date: Nov. 15, 1994

[87] PCT Pub. No.: WO94/21425

PCT Pub. Date: Sep. 29, 1994

[30] Foreign Application Priority Data

Mar. 17, 1993 [JP] Japan .................................. 5-81204

[51] Int. Cl.⁶ .................................................... G06F 15/00
[52] U.S. Cl. .................................. 73/862.193; 73/862.191; 73/104; 364/474.17
[58] Field of Search ........................... 73/862.06, 862.191, 73/104, 862.193; 364/474.67; 318/568.11, 565

[56] References Cited

U.S. PATENT DOCUMENTS

| | | | |
|---|---|---|---|
| 3,667,290 | 6/1972 | Hohn | 73/862.193 |
| 4,351,029 | 9/1982 | Maxey et al. | |
| 4,551,808 | 11/1985 | Smith et al. | 364/474.17 |
| 4,564,911 | 1/1986 | Smith et al. | 364/474.17 |
| 4,802,095 | 1/1989 | Jeppsson | 73/862.06 |
| 4,854,161 | 8/1989 | Drits | 73/104 |
| 4,943,759 | 7/1990 | Sakamoto et al. | |
| 5,030,920 | 7/1991 | Nakamura | 73/104 |
| 5,091,684 | 2/1992 | Iwashita | |
| 5,304,906 | 4/1994 | Arita et al. | |
| 5,440,213 | 8/1995 | Arita et al. | |

FOREIGN PATENT DOCUMENTS

| | | |
|---|---|---|
| 55-5252 | 1/1980 | Japan . |
| 3-110606 | 5/1991 | Japan . |
| 3-103147 | 10/1991 | Japan . |
| 5-116094 | 5/1993 | Japan . |

*Primary Examiner*—Richard Chilcot
*Assistant Examiner*—Ronald Biegel
*Attorney, Agent, or Firm*—Staas & Halsey

[57] ABSTRACT

A method for estimating a load acting on a machine tool and controlling a life of the machine tool based on the estimated load. When predetermined machining is effected on a predetermined workpiece, a disturbance load torque acting on a motor for a spindle or a motor for a feed shaft is estimated by a disturbance estimating observer. When the estimated disturbance load becomes not lower than a set reference value, a timer is reset and started. If the estimated disturbance load torque is kept not smaller than the set reference value until the timer reaches a predetermined set time, a tool change command is issued to stop the machining. Since the tool life is determined in accordance with the magnitude of the load acting on the tool, the tool life is controlled objectively and accurately.

6 Claims, 3 Drawing Sheets

5,602,347

TOOL LIFE CONTROL METHOD BASED ON DISTURBANCE LOAD TORQUE OF MOTOR

BACKGROUND OF THE INVENTION

1. Field of the Invention

The present invention relates to a tool life control method for detecting an expiration of the tool life of a machine tool, and more particularly, to a tool life control method based on a disturbance load estimation.

2. Description of the Related Art

When a machine tool is used for a long period of time, the tool progressively wears out, which deteriorates its cutting capability. It is necessary, therefore, to manage the tools in use so that an exhausted tool is replaced with a new tool. Conventionally, a tool life control is performed by observing the tool itself or a condition of the cut workpiece to see if the tool is worn out. Japanese Patent Laid-Open Publication No. 1-183338 is directed to a method of tool management in which the working hours of individual tools are integrated and when the integrated working hours of the tool reaches a predetermined lifetime, the tool is replaced.

In another conventional tool management method, the wear of the tool is measured by visually observing the tool or the condition of the cut workpiece. In this case, it depends on the experience and intuition of the person in charge of the tool management to determine the time for a tool change. This method lacks accuracy and has no objective criterion for the tool management. Moreover, according to the aforesaid tool management method in which the working hours of each tool is integrated and the tool is changed when the predetermined lifetime is reached by the integrated time, a tool may be replaced as an exhausted tool even if actual wear of the tool is so small that the tool is not yet exhausted. On the other hand, even though the actual tool wear is so large that the time for a tool change is reached, the tool may fail to be changed since the lifetime is not reached by the working time. This method, therefore, involves the problems such as the deterioration of the machining accuracy and the waste of energy and time. Thus, this tool life control based on the working time is not an accurate and absolute method of tool life control.

SUMMARY OF THE INVENTION

The present invention provides a tool life control method in which the life of a tool is determined objectively and accurately in accordance with the estimated magnitude of the load acting on the tool.

A tool life control method for a tool according to the present invention comprises the steps of: executing predetermined machining on a predetermined workpiece using a machine tool; estimating, by a disturbance estimating observer, a disturbance load torque acting on at least one of motors for driving a spindle and a feed shaft during the execution of the machining; and comparing the estimated disturbance load torque with a set reference value and outputting a tool life termination signal when the estimated disturbance load torque reaches the set reference value. According to an aspect of the present invention, the disturbance estimating observer estimates the disturbance load torque based on a torque command value given as a command to the motor and the actual speed of the motor.

Since the cutting capability of the tool declines as the tool wears, the load acting on the tool varies depending on whether the machining is carried out using an unworn tool or a worn tool when the same machining is effected on the same workpiece. Thus, a load acting on the motor for driving a spindle or a feed shaft also varies depending on the degree of wear of the tool. According to the present invention, the load acting on the tool is estimated based on the estimation of the disturbance load torque acting on the motor by the disturbance estimating observer. The change in the estimated disturbance load torque corresponds to the change in the load acting on the tool and the progression of the wear of the tool. Thus, according to the present invention, if the value of the estimated disturbance load torque continues to change for a set period of time or longer while the predetermined workpiece is undergoing the predetermined machining, it is concluded that the tool is worn out and its life has expired. Thus, a tool life command for tool change is outputted.

In the case where the machining using the tool is such that the cutting load increases when the tool is worn out, it is concluded that the tool life has expired when the estimated disturbance load torque is kept not smaller than the set reference value for the set period of time or longer. In the case where the machining using the tool is such that the tool slips on the workpiece surface and the cutting load is extremely reduced to an extreme when the tool is worn out, it is concluded that the tool life has expired when the estimated disturbance load torque is kept not smaller than the set reference value for the set period of time or longer.

DETAILED DESCRIPTION OF THE PREFERRED EMBODIMENTS

Figure 1:
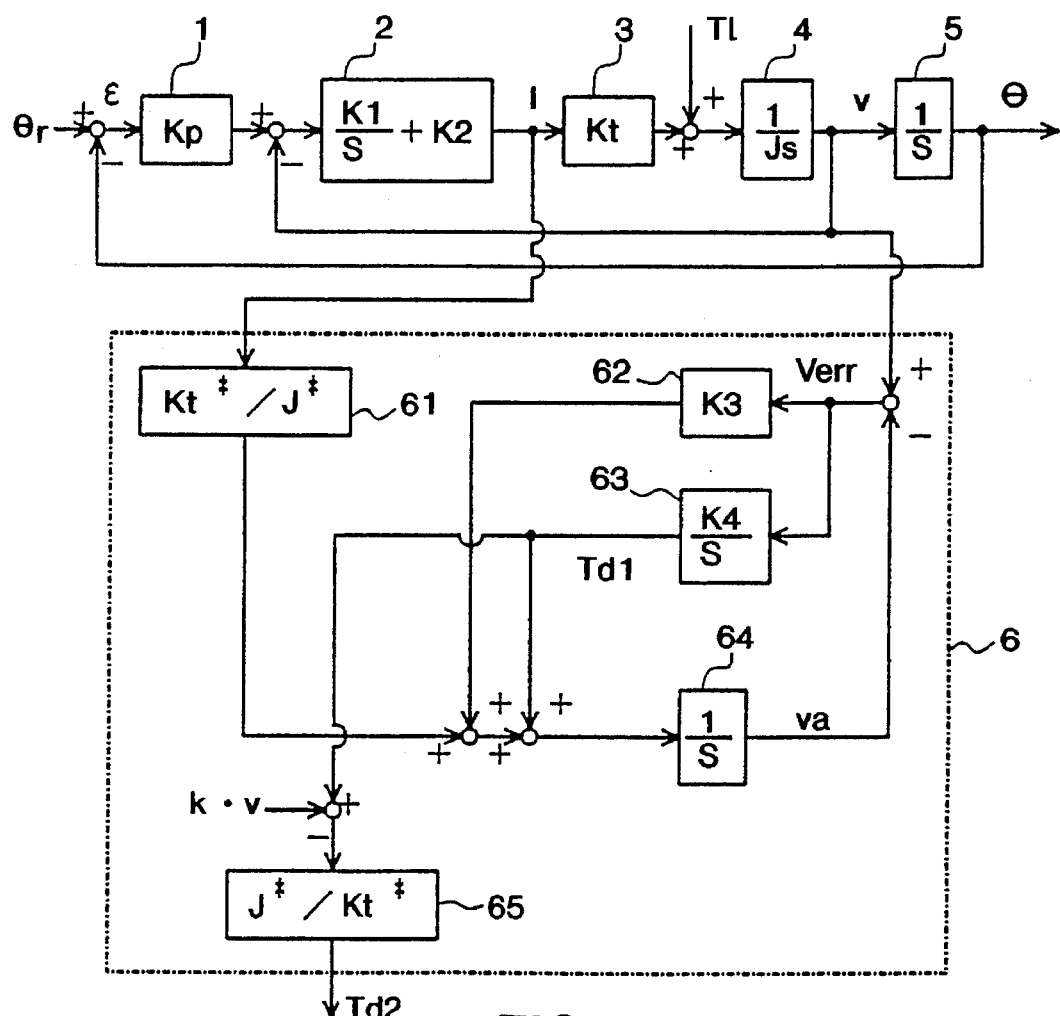
FIG. 1 is a block diagram showing a motor control system and a disturbance estimating observer according to the present invention.

FIG. 1 shows a servomotor control system for performing a proportional control (P control) for the position and a proportional-plus-integral control (PI control) for the speed, thereby driving a feed shaft of a machine tool. FIG. 1 further shows an observer 6 for estimating a disturbance load torque, which is applied to the control system. $K_p$ of term 1 is a proportional gain for a position loop; term 2 is a transfer function for a speed loop; K1 is an integral constant; and K2 is a proportional constant. Terms 3 and 4 are transfer functions of a motor; Kt is a torque constant; J is inertia; and term 5 is a transfer function for calculating the position ($\theta$ by integrating the speed v. Furthermore, $T_L$ is a disturbance torque, and S is a Laplace operator.

A speed command value Vcmd is obtained by multiplying a position deviation $\epsilon(=\theta r-\theta)$, which is obtained by subtracting the feedback value of the present position $\theta$ from the position command value $\theta r$, by the proportional constant Kp. A torque command (current command) 1 is obtained by effecting the PI control on the basis of the difference (speed deviation) between the speed command value Vcmd and the actual speed v, and the motor current is controlled in accordance with the obtained torque command in driving the motor. The motor rotates at the speed v, and the position θ is obtained by integrating the speed v. In estimating the disturbance load torque in this servomotor control system, the disturbance estimating observer 6 for estimating the disturbance load torque is incorporated on the basis of the torque command I and the motor speed v.

K3 of a term 62 and K4 of a term 63 are parameters of the disturbance estimating observer. The term 61 is a parameter to be multiplied by the electric current value I as a torque command actually delivered to the servomotor, and is obtained by dividing an estimated value Kt* of the torque constant of the motor by an estimated value J* of the inertia. Term 64 designates an integral term.

Analyzing the block diagram of FIG. 1 with Kt=K* and J=J*, we obtain $$\{I \cdot Kt + T_L\}(1/J \cdot S) = v \quad (1), \text{ and}$$

$$\{I \cdot (Kt/J) + (v - va)K3 + (v - va)(K4/S)\}(1/S) = va \quad (2),$$

where va is an estimated speed or an output of the integral term 64.

From equation (1), we obtain $$I = (v \cdot J \cdot S - T_L)/Kt \quad (3).$$

Substituting equation (3) in equation (2) and rearranging it, we obtain $$(v \cdot J \cdot S - T_L)/J + (v - va)K3 + (v - va)(K4/S) = va \cdot S \quad (4), \text{ and}$$

$$S(v - va) + (v - va) \cdot K3 + (v - va)(K4/S) = T_L/J \quad (5).$$

From equation (5), $$\begin{aligned} Verr &= (v - va) \quad (6) \\ &= (T_L/J)[1/\{S + K3 + (K4/S)\}]. \end{aligned}$$

Based on the above equation (6), an output Td1 of the term 63 is given by equation (7) as follows:

$$\begin{aligned} Td1 &= Verr \cdot (K4/S) \quad (7) \\ &= (T_L/J)\{K4/(S^2 + K3 \cdot S + K4)\}. \end{aligned}$$

Equation (7) indicates that it can be approximated to Td1=$T_L$/J by selecting the parameters K3 and K4 of equation (7) so that the pole is stable, and the total disturbance torque $T_L$ can be estimated.

According to the following equation (8), an estimated disturbance load torque Td2 is obtained by subtracting a value (k·v), which is proportional to the speed v and equivalent to friction torque, from the total estimated disturbance value Td1, and multiplying the resulting value by a parameter J*/Kt* in term 65.

$$Td2 = (Td1 - k \cdot v)(J^*/Kt^*) \quad (8).$$

Then, machining of a predetermined workpiece is executed according to a predetermined machining program, and whether or not the life of a tool has expired is determined depending on the magnitude of the aforesaid estimated disturbance load torque Td2 obtained at this time.

Figure 2:
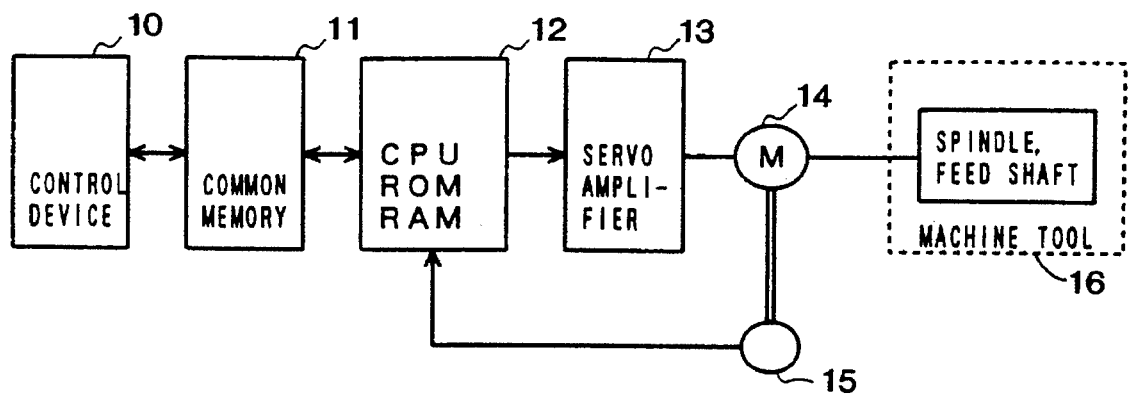
FIG. 2 is a block diagram showing the principal part of a control device of a machine tool for carrying out the present invention.

FIG. 2 is a block diagram showing the principal part of the servomotor control system which performs the method according to the present invention. A movement command and various control signals are delivered from a numerical control device 10 for controlling the machine tool 16 to a digital servo circuit 12 through a common memory 11. The digital servo circuit 12, which is provided with a processor, ROM, and RAM, digitally controls servo control of the position, speed, etc., and controls a servomotor 14 of each axis through a servo amplifier 13 which comprises a transistor inverter or the like. Also, a position/speed detector 15 for detecting the position and speed is composed of a pulse coder or the like which is mounted on the output shaft of the servomotor, and delivers position and speed feedback signals to the digital servo circuit 12. This arrangement is identical with the arrangement of a conventional digital servo circuit.

Thereupon, the machining of the predetermined workpiece based on the predetermined machining program is executed in order to determine whether or not the tool life has expired. The constants K3 and K4, estimated torque constant value Kt*, estimated inertia value J*, and estimated friction torque coefficient k of the observer 6 are previously set in the digital servo circuit 12. Also, a reference value Ts for detecting the tool life and a load change duration are previously set in the numerical control device.

Figure 3:
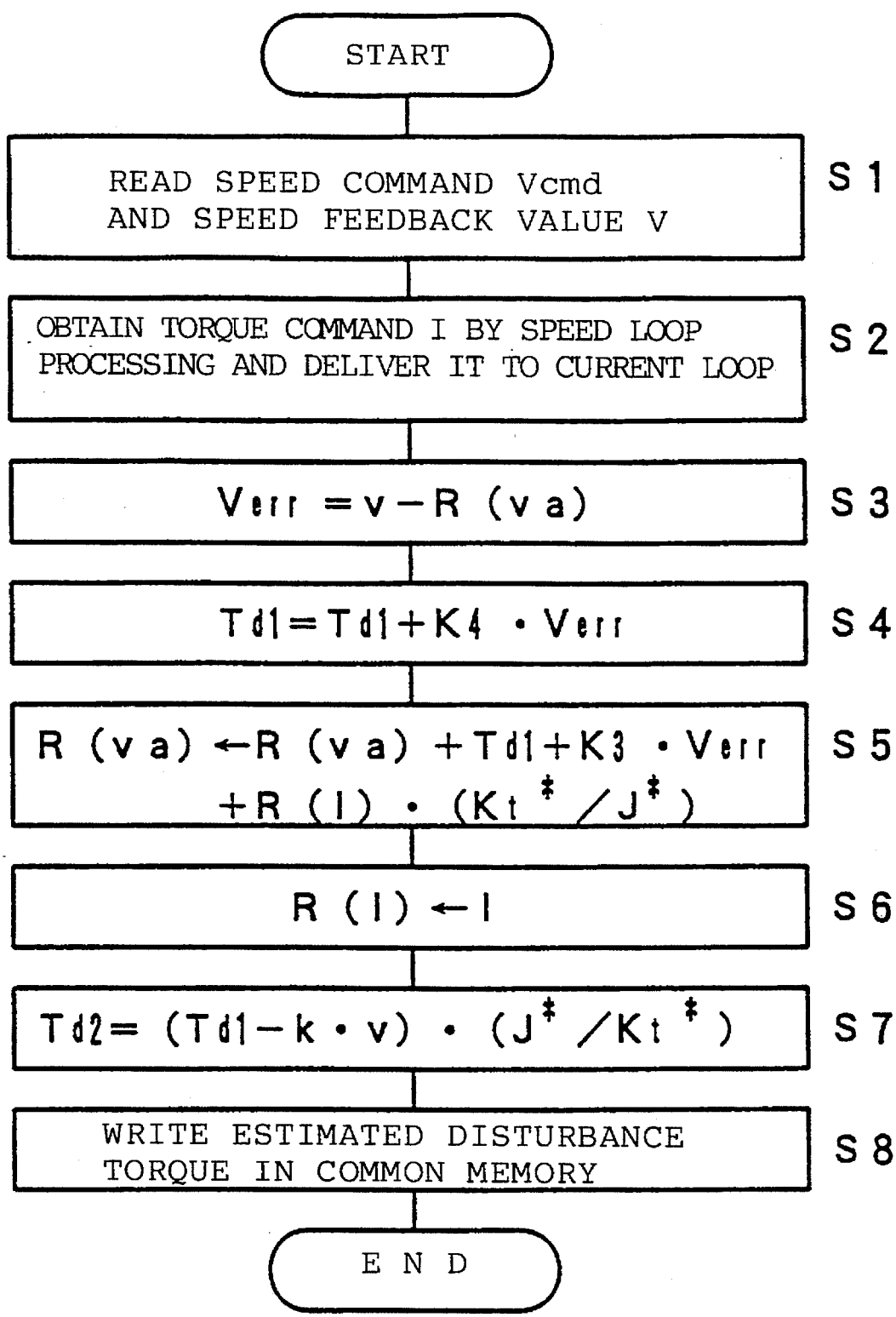
FIG. 3 is a flow chart showing a speed loop processing for each speed loop processing period and a disturbance estimating observer processing according to one embodiment of the present invention.

FIG. 3 is a flow chart showing a speed loop processing, performed by the processor of the digital servo circuit 3 with every speed loop processing period, and showing a processing by the disturbance estimating observer. When the machining is started, the processor of the digital servo circuit 12 executes this processing with every speed loop processing period.

First, the speed command value Vcmd obtained through a position loop processing and the speed feedback value v indicative of the actual speed of the servomotor fed back from the position/speed detector 15 are read in Step S1. In Step S2, the torque command I is obtained by executing the speed loop processing in the aforesaid manner based on the speed command value Vcmd and the speed feedback value v, and is delivered to a current loop. Then, the processing by the disturbance estimating observer is started. In Step S3, the difference Verr between the actual speed and the estimated speed is obtained by subtracting the estimated speed va stored in a register R(va) from the speed feedback value v read in Step S1. In Step S4, moreover, the total estimated disturbance value Td1 for the period concerned is obtained by adding a value, which is obtained by multiplying the obtained difference Verr by a set constant K4, to an accumulator, which stores the total estimated disturbance value Td1. This processing of Step S4 is a processing based on the element 63 in FIG. 1.

Then, in Step S5, the total estimated disturbance value Td1 obtained in Step S4 is added to the value in the register R(va), which stores the estimated speed va, and the product of the difference Verr obtained in Step S3 and the constant K3 is added. Furthermore, the estimated speed value va for the period concerned is obtained by adding the product of the torque command I, which is stored in a register R(I) and read in the preceding period, to the ratio (Kt*/J*) between the estimated torque constant and the estimated inertia, and is loaded into the register R(va). This processing of Step S5 is a processing in which the estimated speed va is obtained through processing by the elements 61, 62, 64, etc. in FIG. 1.

In Step S6, the torque command value I read in Step S2 is loaded into the register R(I). In Step S7, the friction torque (k·v) which is proportional to the speed is subtracted from the total estimated disturbance value Td1 obtained in Step S4. Then, the obtained value is multiplied by the ratio (J*/Kt*) between the estimated inertia and the estimated torque constant to obtain the estimated disturbance load torque Td2 excluding the friction torque. Thus, the estimated disturbance load torque Td2 is obtained by executing the computation of the aforesaid equation (8) in accordance with the total estimated disturbance value Td1, set coefficient k, speed feedback value V read in Step S1, and ratio (J*/Kt*) between the estimated inertia and the estimated torque constant. The estimated disturbance load torque Td2 thus obtained is written in the common memory 11 in Step S8, whereupon processing of the speed loop concerned terminates. Thereafter, the aforementioned processings are executed with every speed loop processing period, so that the estimated disturbance load torque Td2 which changes every moment is written in the common memory 11.

Figure 4:
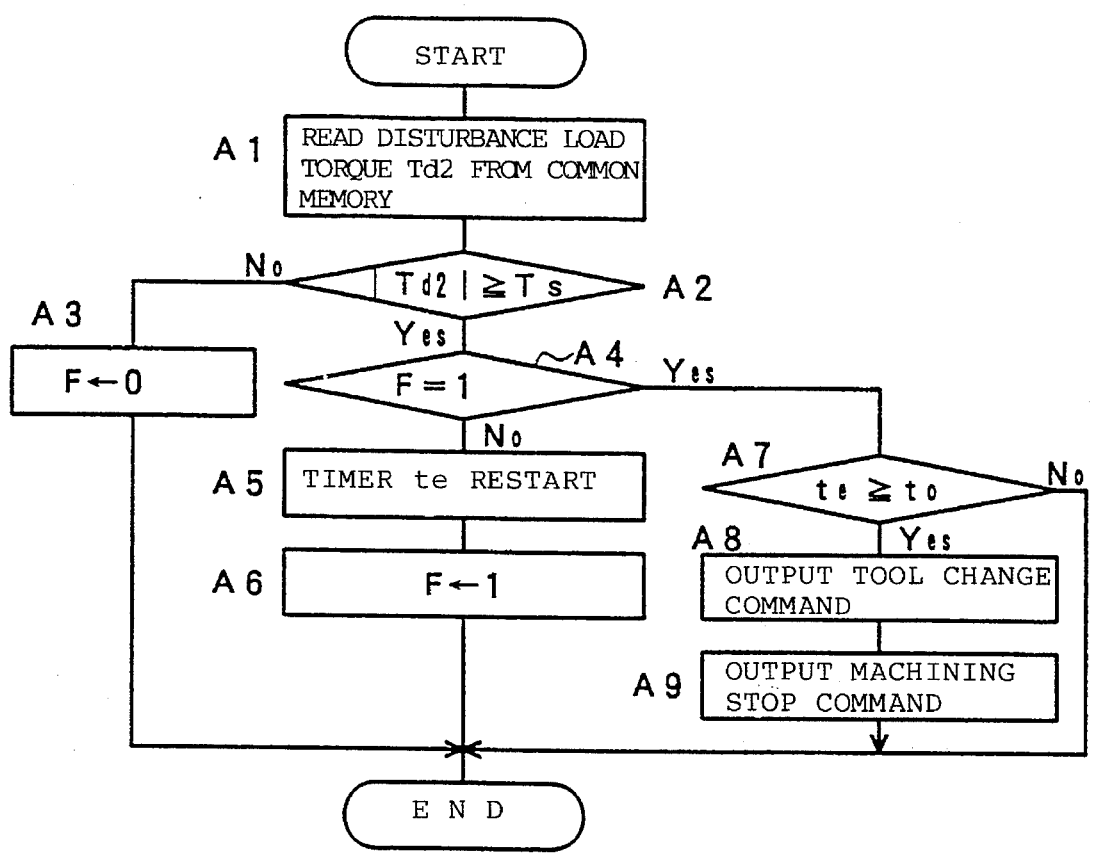
FIG. 4 is a flow chart showing a tool life decision processing to be executed by a numerical control device.

On the other hand, a processor for PMC (programmable machine controller), which executes sequence control in the numerical control device 1 0, executes the processings shown in FIG. 4 with every predetermined period which is longer than the aforesaid speed loop processing period.

First, the estimated disturbance load torque Td2 is read from the common memory 11 in Step A1, and it is determined in Step A2 whether or not the absolute value of the estimated disturbance load torque Td2 is larger than or equal to a set reference value Ts. If the absolute value of Td2 is smaller than the set reference value Ts, the program advances to Step A3, whereupon a flag F is set at "0" to terminate the processings for the period concerned, concluding that the tool life has not yet expired. On the other hand, if the absolute value of the estimated disturbance load torque Td2 is not smaller than the set reference value Ts, the program advances to Step A4, whereupon it is determined whether or not the flag F is set at "1". If the flag F is not set at "1", a timer te is reset and started in Step A5, and the flag F is set at "1" in Step A6. If the absolute value of the estimated disturbance load torque Td2 is not smaller than the set reference value Ts also in the next period, the program proceeds from Step A4 to Step A7, since the flag F is set at "1" in the preceding period. In Step A7, it is determined whether or not a set time to is reached or exceeded by the timer te. If the set time to is not reached, the processings for the period concerned are finished.

Thereafter, the aforesaid processings of Steps A1, A2, A4 and A7 are repeated as long as the absolute value of the estimated disturbance load torque Td2 is kept larger than or equal to the set reference value Ts. If it is concluded in Step A7 that the set time to is reached or exceeded by the value in the timer te, a tool change command as a tool life signal is outputted, concluding that the tool life has expired, thereby causing a display unit or the like to display a message to the effect that the tool life has expired and that the tool should be replaced, in Step A8. Then, in Step A9, a machining stop command is outputted to stop the machining.

After the timer starts the timing operation as the absolute value of the estimated disturbance load torque Td2 is not smaller than the set reference value Ts, if the absolute value of the estimated disturbance load torque Td2 becomes smaller than the set reference value Ts before the timer te reaches the set time t0, the flag F is set at "0" in Step A3, and the processings of Step A1, A2 and A3 are repeated without outputting the tool change command. When the absolute value of the estimated disturbance load torque Td2 becomes not smaller than the set reference value Ts again, the processings of Steps A1, A2, and A4 to A6 are executed, whereupon the timer te is reset again to start the timing operation.

Thus, the tool change command is outputted only when the absolute value of the estimated disturbance load torque Td2 is kept not smaller than the set reference value Ts for a predetermined period of time te or longer, and the tool change command will not be outputted even if the reference value TS is exceeded instantaneously by the estimated disturbance load torque Td2.

Described in connection with the above embodiment is an example in which wear of the tool is detected in the case where the tool and machining are such that the load increases when the tool wears. On the contrary, in the case where the tool slips on the surface of workpiece due to the reduction of the load caused by the wear of the tool, the tool life detection processing differs from the processing shown in FIG. 4 only in that the program proceeds from Step A2 to Step A4 when the absolute value of the estimated disturbance load torque Td2 becomes not larger than a set reference value Ts'.

Furthermore, according to the foregoing embodiment, the tool life is detected by the feed shaft of the machine tool. Alternatively, however, the tool life may be detected by determining the load acting on a spindle by the disturbance estimating observer. In this case, as the spindle is not subjected to position control normally, the position feedback control and the element 1 shown in FIG. 1 are eliminated. This processing differs only in that a speed command is applied directly to the element 2, so that the rest of the processing remains the same as the one shown in FIG. 1, and the disturbance estimating observer 6 remains unchanged. Furthermore, in this case, the element 12, the servo amplifier as the element 13, and the motor shown in FIG. 2 are replaced with a digital circuit for controlling the spindle, a spindle amplifier, and a spindle motor, respectively.

According to the present invention, whether or not the tool life has expired is determined depending on the magnitude of the estimated load acting on the tool, so that the tool life and the time for tool change can be judged objectively and accurately.

We claim:

1. A method of controlling a tool life of a machine tool having a spindle and a feed shaft, comprising the steps of:

(a) executing a predetermined machining operation on a predetermined workpiece using said machine tool;

(b) estimating, using a disturbance estimating observer, a disturbance load torque acting on a motor for driving said spindle or a motor for driving said feed shaft during the execution of said machining operation;

(c) comparing said estimated disturbance load torque with a set reference value and outputting a tool life termination signal when said estimated disturbance load torque reaches the set reference value; and controlling said tool life of said machine tool based on said tool life termination signal.

2. A tool life control method of a machine tool according to claim 1, wherein said step (c) includes a step of outputting the tool life termination signal when said estimated disturbance load torque is maintained at a value not smaller than the predetermined reference value for at least a predetermined period of time.

3. A tool life control method of a machine tool according to claim 1, wherein said step (c) includes a step of outputting the tool life termination signal when said estimated disturbance load torque is maintained at a value not larger than the set reference value for at least a set period of time.

4. A tool life control method of a machine tool according to claim 1, wherein said step (b) includes a step of estimating said disturbance load torque by said disturbance estimating observer based on a torque command value given as a command to said motor and an actual speed of said motor.

5. A tool life control method of a machine tool according to claim 4, wherein said step (c) includes a step of outputting the tool life termination signal when said estimated disturbance load torque is maintained at a value not smaller than the set reference value for at least a set period of time.

6. A tool life control method of a machine tool according to claim 4, wherein said step (c) includes a step of outputting the tool life termination signal when said estimated disturbance load torque is maintained at a value not larger than the set reference value for at least a set period of time.

* * * * *